United States Patent
Yumiba et al.

(10) Patent No.: US 12,014,530 B2
(45) Date of Patent: Jun. 18, 2024

(54) IMAGE RECOGNITION DEVICE AND METHOD

(71) Applicant: HITACHI HIGH-TECH CORPORATION, Tokyo (JP)

(72) Inventors: Ryou Yumiba, Tokyo (JP); Yasutaka Toyoda, Tokyo (JP); Hiroyuki Shindo, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 611 days.

(21) Appl. No.: 17/286,604

(22) PCT Filed: Dec. 21, 2018

(86) PCT No.: PCT/JP2018/047224
§ 371 (c)(1),
(2) Date: Apr. 19, 2021

(87) PCT Pub. No.: WO2020/129235
PCT Pub. Date: Jun. 25, 2020

(65) Prior Publication Data
US 2021/0374403 A1    Dec. 2, 2021

(51) Int. Cl.
*G06V 10/44* (2022.01)
*G06F 18/20* (2023.01)
(Continued)

(52) U.S. Cl.
CPC .......... *G06V 10/44* (2022.01); *G06F 18/2113* (2023.01); *G06F 18/213* (2023.01);
(Continued)

(58) Field of Classification Search
CPC .... G06V 10/44; G06V 10/7715; G06V 10/82; G06V 20/695; G06V 20/698;
(Continued)

(56) References Cited

U.S. PATENT DOCUMENTS

2014/0370480 A1   12/2014  Sugibuchi et al.
2017/0011523 A1*   1/2017  Magai .................. G06F 18/217
(Continued)

FOREIGN PATENT DOCUMENTS

JP    2001-236337 A    8/2001
JP    2001-339265 A   12/2001
(Continued)

OTHER PUBLICATIONS

International Search Report of PCT/JP2018/047224 dated Apr. 2, 2019.

*Primary Examiner* — Phuoc Tran
(74) *Attorney, Agent, or Firm* — MATTINGLY & MALUR, PC

(57) ABSTRACT

In order to select an optimal learning model for an image when inference is carried out in the extraction of a profile line using machine learning, without requiring a correct value or degree of certainty, a feature extraction learning model group containing a plurality of learning models is used for feature extraction. A recall learning model group containing recall learning models is paired with the feature extraction learning models. A feature amount extraction unit for referencing a feature extraction learning model and extracting a feature amount from input data; a data-to-data recall unit for referencing a recall learning model and outputting a recall result with the feature amount subjected to dimensional compression; and a learning model selection unit for selecting a feature extraction learning model from the feature extraction learning model group under the condition that the difference between the feature amount and the recall result is minimized are provided.

26 Claims, 12 Drawing Sheets

(51) Int. Cl.
*G06F 18/2113* (2023.01)
*G06F 18/213* (2023.01)
*G06N 20/00* (2019.01)
*G06V 10/77* (2022.01)
*G06V 10/82* (2022.01)
*G06V 20/69* (2022.01)

(52) U.S. Cl.
CPC ........... *G06F 18/285* (2023.01); *G06N 20/00* (2019.01); *G06V 10/7715* (2022.01); *G06V 10/82* (2022.01); *G06V 20/695* (2022.01); *G06V 20/698* (2022.01)

(58) Field of Classification Search
CPC ............. G06V 2201/06; G06F 18/2113; G06F 18/213; G06F 18/285; G06N 20/00; G06T 2207/20081; G06T 2207/30148; G06T 7/12; G06T 7/00
See application file for complete search history.

(56) References Cited

U.S. PATENT DOCUMENTS

2019/0180464 A1\* 6/2019 Kraft ................. G01F 22/00
2021/0089812 A1\* 3/2021 Li ..................... G06N 3/08

FOREIGN PATENT DOCUMENTS

JP 2012-068965 A 4/2012
JP 2015-001888 A 1/2015

\* cited by examiner

DATABASE DB

| SYMBOL | FEATURE EXTRACTION LEARNING MODEL M2 | RECALL LEARNING MODEL M4 |
|---|---|---|
| a | FEATURE EXTRACTION LEARNING MODEL m2a | RECALL LEARNING MODEL m4a |
| b | FEATURE EXTRACTION LEARNING MODEL m2b | RECALL LEARNING MODEL m4b |
| ... | | |

IMAGE RECOGNITION DEVICE AND METHOD

TECHNICAL FIELD

The present invention relates to, for example, an image recognition device and a method for inspecting a semiconductor pattern.

BACKGROUND ART

Pattern recognition using machine learning such as deep learning can extract various patterns with high accuracy from various images, and can be expected to be effective in applications such as extracting contour lines from semiconductor patterns. The contour lines extracted from the semiconductor pattern are used for shape evaluation and the like by comparing with the design drawing of the semiconductor pattern.

When operating multiple types of images as inference targets in contour extraction, for example, when operating images of multiple manufacturing processes such as lithography and etching in a semiconductor manufacturing process as inference targets, it is desirable to divide the learning model in order for contour line extraction using machine learning to exhibit even higher performance when the difference in appearance is large for each type of image.

The learning model is a parameter such as a coefficient of a network structure of deep learning, and is calculated using a predetermined learning operation in advance according to the learning model from a learning sample consisting of a set of an image and training data (inference result that is the target of learning). Due to the nature of machine learning, in order to extract a good contour line from an image, an image having the characteristics of the image to be inferred, that is, an image similar to the inference target, is necessarily included in the learning sample used for the learning calculation. In order for the contour line extraction to exhibit higher performance, it is desirable that the learning sample does not include an image that is not similar to the image to be inferred. This is because the learning operation can obtain a learning model specialized for contour extraction from the image to be inferred.

On the other hand, when a plurality of learning models are prepared, a method of selecting an optimum learning model from the plurality of learning models is required. The optimum learning sample refers to a learning model that can extract the best contour line from an image given during operation.

PTL 1 discloses a method of selecting an optimum learning model from a plurality of learning models under a condition that the prediction error is the smallest. The prediction error is an error between the predicted value and the correct answer value when inferred using the learning model.

PTL 2 discloses a method of selecting an optimum learning model from a plurality of learning models by a selection method using an index called the degree of certainty. The degree of certainty is an index calculated from the intermediate processing result until the inference result is obtained using the learning model, and is a measure of the certainty of the inference result (expected value of being correct).

CITATION LIST

Patent Literature

PTL 1: JP 2001-236337 A
PTL 2: JP 2001-339265 A

SUMMARY OF INVENTION

Technical Problem

The methods described in PTLs 1 and 2 described above are useful in applying to image recognition devices and methods in semiconductor pattern inspection.

However, the method of PTL 1 has a first problem that the correct answer value is required for selection of a learning model. The correct answer value for contour line extraction is the inference result of the contour line accurately extracted at every part of the image. The accurately extracted contour line can be obtained, for example, by manually assigning the correct answer value for contour line extraction to each pixel in the image, but preparing this for each image to be inferred takes a lot of work time and man-hours until the start of operation.

In addition, since the degree of certainty to be focused on in PTL 2 differs depending on the type of learning model (mathematical model of machine learning, network structure of deep learning, etc.), it is not applicable when multiple types of learning models are to be selected, which is a second problem.

From the above, an object of the invention is to provide an image recognition device and a method which can select an optimum learning model for an image at the time of inference when a contour line is extracted using machine learning without requiring a correct answer value or the degree of certainty.

Solution to Problem

In the invention, there is provided "An image recognition device includes a feature extraction learning model group that stores a plurality of feature extraction learning models, a recall learning model group that stores a recall learning model which is paired with the feature extraction learning model, a feature amount extraction unit that extracts a feature amount from input data with reference to the feature extraction learning model, a data-to-data recall unit that outputs a recall result accompanied by dimensional compression of the feature amount with reference to the recall learning model, and a learning model selection unit that selects the feature extraction learning model from a feature extraction learning model group under a condition that a difference between the feature amount and the recall result is minimized".

In the invention, there is provided "An image recognition device includes a feature extraction learning model that stores a plurality of feature extraction learning models, a feature amount extraction unit that extracts a feature amount from input data with reference to the feature extraction learning model, and a learning model selection unit that calculates a common scale capable of being compared between a plurality of types of learning models from a score when the feature amount extraction unit extracts the feature amount, and selects the feature extraction learning model using the common scale from a feature extraction learning model group".

In the invention, there is provided "An image recognition method that has a plurality of feature extraction learning models and a plurality of recall learning models which are paired with feature extraction learning models, includes extracting a feature amount from input data with reference to the feature extraction learning mode, obtaining a recall result accompanied by dimensional compression of the feature amount with reference to the recall learning model, and selecting the feature extraction learning model from a feature extraction learning model group under a condition that a difference between the feature amount and the recall result is minimized".

In the invention, there is provided "An image recognition method that has a plurality of feature extraction learning models, includes extracting a feature amount from input data with reference the feature extraction learning model, calculating a common scale which can be compared among a plurality of types of learning models from a score when the feature amount is extracted, and selecting the feature extraction learning model using the common scale from the plurality of feature extraction learning models".

Advantageous Effects of Invention

By applying the invention, when input data is an image and a feature amount is a contour line, the feature amount is extracted from the image to be inferred, and a recall result of the feature amount is acquired, and a feature amount extraction learning model can be selected under a condition that the difference between the feature amount and the recall result is minimized.

DESCRIPTION OF EMBODIMENTS

Hereinafter, specific examples of the invention will be described with reference to the drawings.

First Embodiment

Figure 1:
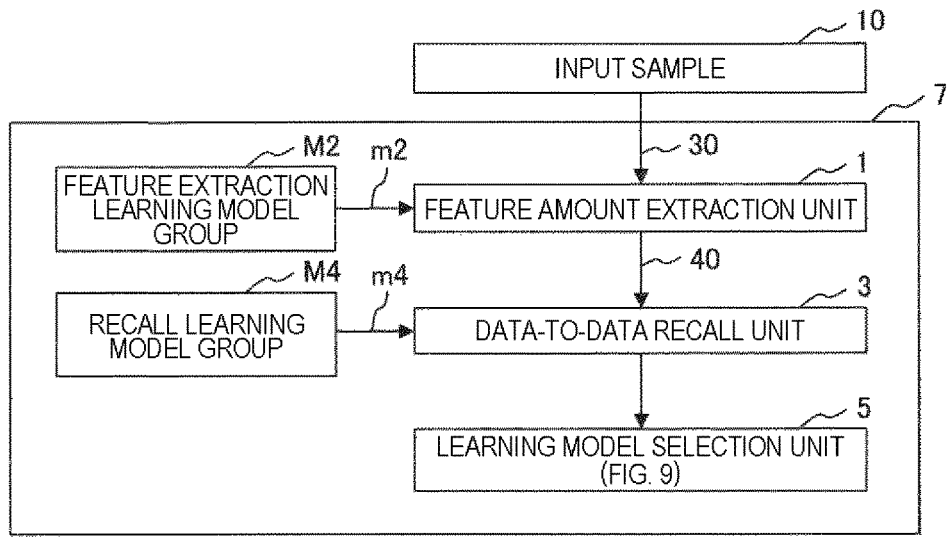
FIG. 1 is a diagram illustrating an example of a functional configuration of an image recognition device according to a first embodiment of the invention.

FIG. 1 illustrates an example of the functional configuration of an image recognition device according to a first embodiment of the invention realized by using a computer device.

First, the outline of the functional configuration of FIG. 1 will be described. In a computer device 7, a feature amount extraction unit 1, a data-to-data recall unit 3, and a learning model selection unit 5, which are the processes realized by the arithmetic functions such as a CPU, are generally composed of a feature extraction learning model group M2 and a recall learning model group M4 realized by the database. The computer device 7 incorporates an input sample 10 which is a sample at the time of operation of the image to be the target of contour extraction in the inspection of a semiconductor pattern.

The feature extraction learning model group M2 stores two or more feature extraction learning models m2 in the database. The recall learning model group M4 stores two or more recall learning models m4 in the database. The feature extraction learning model group M2 and the recall learning model group M4 share the assigned symbols of the feature extraction and recall learning models m2 and m4, and the feature extraction and recall learning models m2 and m4 of the same symbol are a pair learned from the same learning sample.

The feature amount extraction unit 1 has a function of extracting a contour line (hereinafter, the contour line extracted by the feature amount extraction unit 1 is referred to as a feature amount) from the image in the input sample 10 with reference to the feature extraction learning model m2. The feature amount is extracted from the image in the input sample 10 for each feature extraction learning model m2 in the feature extraction learning model group M2.

The data-to-data recall unit 3 has a function of recalling the feature amount from the feature amount with reference to the recall learning model m4, and recalls the feature amount from each feature amount output by the feature amount extraction unit 1. Hereinafter, the feature amount recalled by the data-to-data recall unit 3 is referred to as the recall result.

The learning model selection unit 5 selects the learning model m2 that minimizes the difference between the feature amount output by the feature amount extraction unit 1 and the feature amount output by the data-to-data recall unit 3, and outputs the symbol assigned to the learning model m2. Each function in FIG. 1 described above can be realized by signal processing on any computer.

The details of each configuration function in FIG. 1 will be described below. The input sample 10 is a small number of image samples for which the feature amount is to be extracted during operation. A small number of samples are obtained by randomly selecting images to be taken during operation. The input sample 10 is collected from a limited number of manufacturing processes and the like, and is composed of one or a small number of types of images in the small number of samples.

Figure 2:
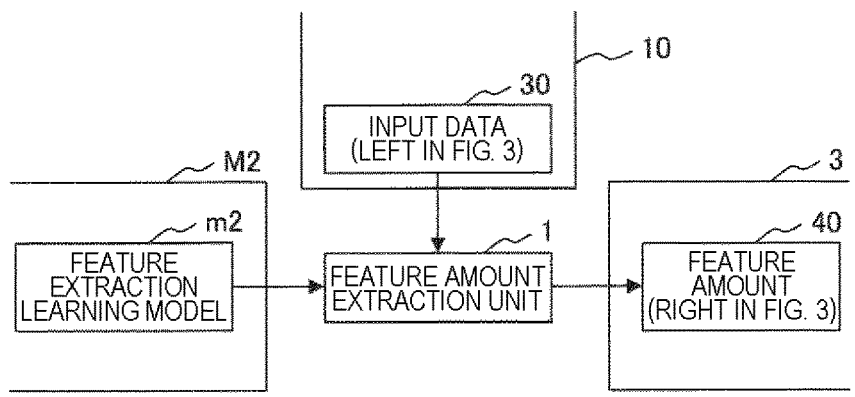
FIG. 2 is a diagram for explaining input/output of a feature amount extraction unit 1.

FIG. 2 is a diagram for explaining input/output of the feature amount extraction unit 1. The function of the feature amount extraction unit 1 alone will be described with reference to FIG. 2. When the feature amount extraction unit 1 pays attention to one feature extraction learning model m2 in the feature extraction learning model group M2 and refers to it, the feature amount 40 is output from one input data 30 in the input sample 10 to the data-to-data recall unit 3 using semantic segmentation.

Figure 3:
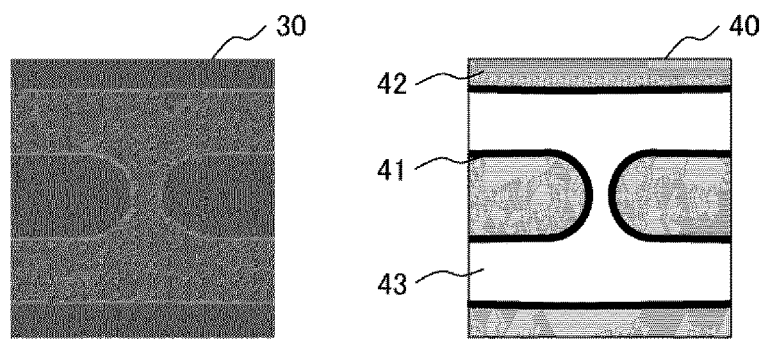
FIG. 3 is a diagram illustrating an example of one typical input data 30 and one feature amount 40 obtained by using semantic segmentation for one input data 30.

FIG. 3 illustrates an example of one typical input data and one feature amount 40 obtained using semantic segmentation for one input data 30. First, the input data 30 is an image for which the contour line is to be extracted as illustrated in the example on the left side of FIG. 3, and each pixel in the image is, for example, 256×256 bit data.

Here, the semantic segmentation is a machine learning method for discriminating the category of each pixel in an image. The feature extraction learning model m2 is a parameter such as a load coefficient and a threshold referred to in the semantic segmentation.

As illustrated in the example on the right side of FIG. 3, one feature amount 40 obtained by using semantic segmentation in the feature amount extraction unit 1 is one (extraction result of the contour line) obtained by roughly classifying the components (pixels) in the input data 30 into a category such as a contour line 41, a closed region (a region surrounded by the contour line 41), and a background 43.

The relationship between the input (one input data 30) and the output (one feature amount 40) of the feature amount extraction unit 1 has been explained with reference to FIG. 3, but this extraction is realized using the feature extraction learning model m2. Therefore, next the feature extraction learning model m2 side will be described.

The feature extraction learning model m2 is calculated by a predetermined learning operation from a learning sample composed of one or more sets of input data 30 and training data. Here, the training data is an image having the same format as the feature amount 40 illustrated on the left side of FIG. 3, and the category of each pixel in the image is appropriately assigned. In this learning calculation, the difference between the feature amount output by the feature amount extraction unit 1 from the input data 30 included in the learning sample and the training data in the learning sample is optimized to be minimized.

By this learning calculation, when the feature amount extraction unit 1 refers to the feature extraction learning model m2 and the input data 30 similar to the learning sample is given, the category of each pixel in the input data 30 is accurately classified. It becomes possible to output the feature amount 40 in which the category of each pixel in the input data 30 is discriminated accurately. On the other hand, when the feature amount extraction unit 1 refers to the learning model m2 and the input data 30 deviated from the learning sample is given, it is out of the optimization range, so that the pixels in the feature amount 40 are discriminated erroneously. The erroneous discrimination is likely to appear especially in the input data 30 where the appearance of the learning sample and the image deviate from each other.

In the configuration diagram of FIG. 1, the feature amount extraction unit 1 extracts the feature amount 40 for each combination of the input data 30 (one or more) in the input sample 10 and the feature extraction learning model m2 (two or more) included in the feature extraction learning model group M2.

Figure 4:
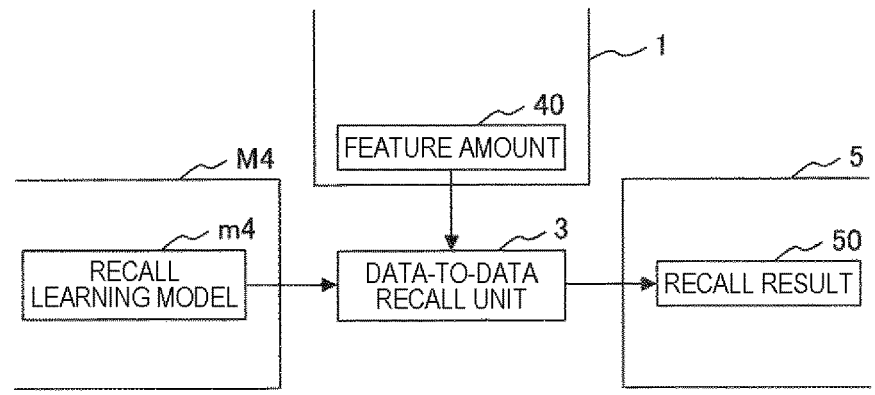
FIG. 4 is a diagram for explaining input/output of a data-to-data recall unit 3.

FIG. 4 is a diagram for explaining input/output of the data-to-data recall unit 3. Next, the function of the data-to-data recall unit 3 alone will be described with reference to FIG. 4. When the data-to-data recall unit 3 refers to one recall learning model m4 in the recall learning model group M4, the data-to-data recall unit 3 outputs one recall result 50 from one feature amount 40 to the learning model selection unit 5 by using dimensional compression.

Figure 5:
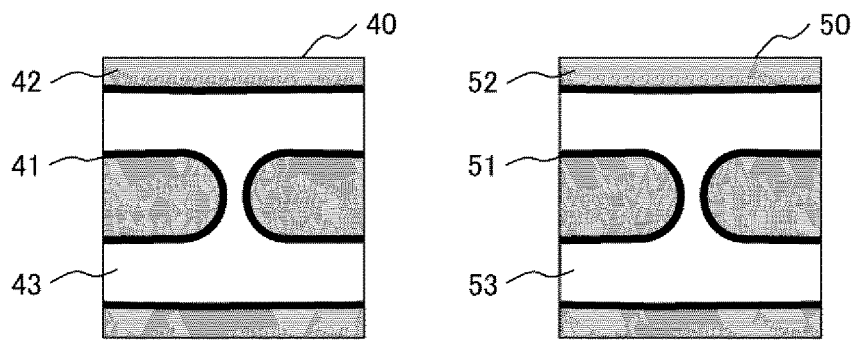
FIG. 5 is a diagram illustrating an example of one typical feature amount 40 and one early result 50.

FIG. 5 illustrates an example of one typical feature amount 40 and one early result 50. First, the recall result 50 on the right side of FIG. 5 is composed of a contour line 51, a closed region 52, and a background 53, which is a category having the same components as the feature amount 40 (composed of the category of the contour line 41, the closed region 42, and the background 43) illustrated on the left side of FIG. 5. In the configuration diagram of FIG. 1, the data-to-data recall unit 4 outputs the recall result 50 for each combination of the feature amount 40 output by the feature amount extraction unit 1 and the recall learning model 14 included in the recall learning model group M4.

Figure 6:
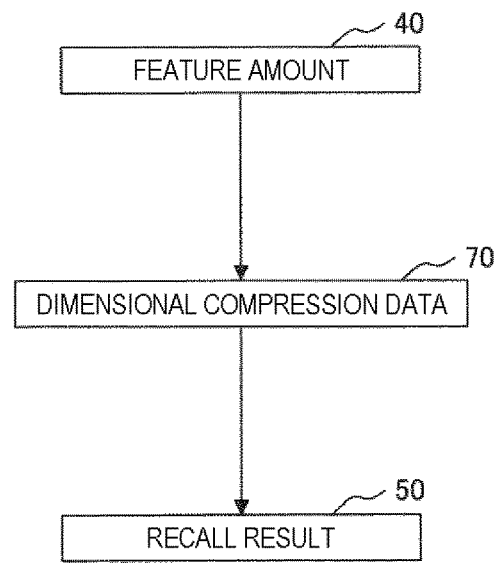
FIG. 6 is a diagram for explaining dimensional compression in the data-to-data recall unit 3.

According to the illustration in FIG. 5, the difference between the feature amount 40 and the recall result 50 is not always clear, but the recall result 50 is information obtained by dimensionally compressing the feature amount 40. Dimensional compression in the data-to-data recall unit 3 will be described with reference to FIG. 6. Dimensional compression indicates the calculation in which the feature amount 40 is mapped (compressed) to the dimensional compression data 70 having a lower dimension than the feature amount 40, and then again mapped (restored) to the recall result 50 when the feature amount 40 and the recall result are regarded as high-dimensional data (data of the dimension of the number of pixels) composed of the components (pixels).

In this dimensional compression, if the feature amount 40 is within a predetermined range in the high-dimensional space corresponding to the dimensional compression data 70, almost no information is lost in the process of compressing the feature amount 40 to the dimensional compression data 70. The difference between the recall result 50 and the feature amount 40 is small. Contrary to dimensional compression, if the feature amount 40 deviates from a predetermined range in the high-dimensional space, information is lost in the process of compressing the feature amount 40 to the dimensional compression data 70. The difference between the recall result 50 and the feature amount 40 tends to become large. This dimensional compression can be realized by applying a general algorithm such as principal component analysis or deep learning autoencoder.

Figures 7, 8:
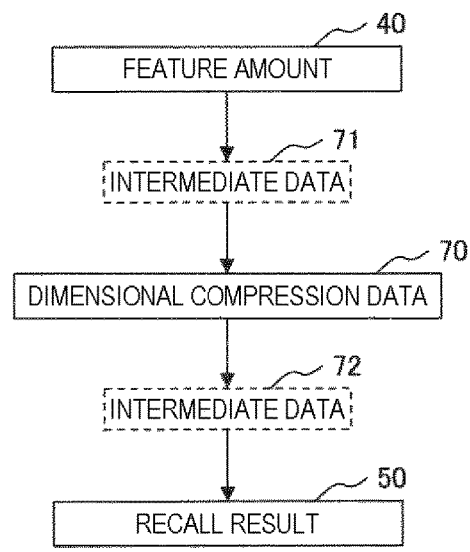
FIG. 7 is another form of dimensional compression in the data-to-data recall unit 3.
FIG. 8 is a diagram illustrating a data storage method in a database that stores a feature extraction learning model group M2 and a recall learning model group M4.

FIG. 7 is a diagram for explaining another form of dimensional compression in the data-to-data recall unit 3. As illustrated in FIG. 7, the dimensional compression may include intermediate data 71 and 72 for mapping data between the feature amount 40 and the dimensional compression data 70 or between the dimensional compression data 70 and the recall result 50. In this case as well, the above-mentioned properties do not change.

FIG. 4 explains the relationship between the input (one feature amount 40) and the output (one early result 50) of the data-to-data recall unit 3 with an example. Since this dimensional compression is realized using the recall learning model m4, the recall learning model m4 side will be explained next.

The recall learning model m4 is a parameter such as a load coefficient and a threshold to be referred to in dimensional compression. In the learning calculation, the recall learning model m4 is required from the learning sample consisting of one or more feature amounts 40, so that the difference between the feature amount 40 in the learning sample and the recall result 50 is small. By this learning operation, even if the feature amount 40 in the learning sample is compressed into the low-dimensional data 70, the information is hardly lost as much as possible. (If the complexity of the distribution of the features 40 in the learning sample is within the permissible range of the recall learning model m4, almost all the information is completely not lost even if the feature amount 40 in the learning sample is compressed into the low-dimensional data 70.)

As a result, when the feature amount 40 similar to the learning sample is given to the data-to-data recall unit 3, the information lost even if compressed into the low-dimensional data 70 is small (or almost none), so the difference between the recall result 50 and the feature amount 40 becomes small. On the other hand, when the feature amount 40 that deviates from the learning sample is given to the data-to-data recall unit 3, a lot of information is lost in the process of being compressed into the low-dimensional data 70, so the difference between the recall result 50 and the feature amount 40 becomes larger.

FIG. 8 is a diagram illustrating a data storage method in a database DB that stores a feature extraction learning model group M2 and a recall learning model group M4. In the feature extraction learning model group M2 and the recall learning model group M4, two or more stored feature extraction learning models m2 and recall learning models m4 are assigned with the same symbol 20 as a and b as illustrated in FIG. 8 so as to managed in the database DB, for example. Here, the symbol 20 may be assigned with an arbitrary symbol such as a serial number. The feature extraction learning model m2 and the recall learning model m4, to which the same symbol is assigned, are a pair calculated from the same learning sample.

The outline of the signal processing of the learning model selection unit 5 will be described using the flow of FIG. 9. In this flow, the combination of Processing step S1 and Processing step S6 means that the processing between them is repeatedly executed for each learning model. Further, in this flow, the combination of Processing step S2 and Processing step S4 means that the processing between them is repeatedly executed for each feature amount.

Figure 9:
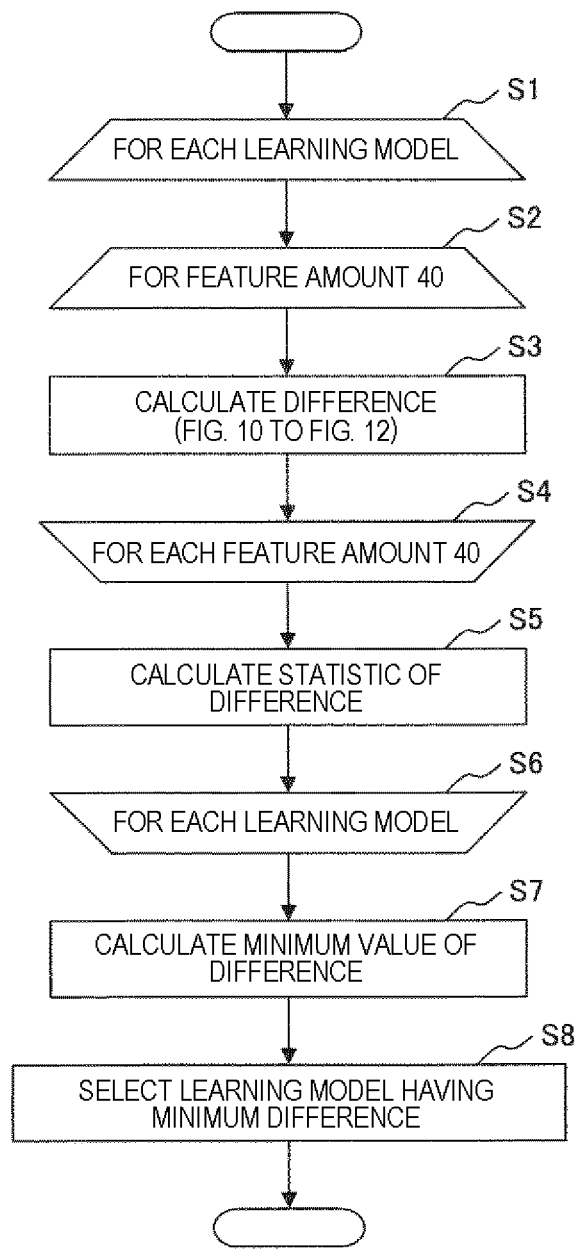
FIG. 9 is a diagram illustrating a signal processing flow of a learning model selection unit 5.

According to the flow of FIG. 9, first, in each of the feature extraction learning models m2 in the feature extraction learning model group M2 (Processing step S1 to Processing step S6), the difference between the feature amount 40 and the recall result 50 is obtained (Processing step S3) for each of the feature amount 40 output by the feature amount extraction unit 1 (Processing step S2 to Processing step S4). Then, the statistic of the difference over the plurality of feature amounts 40 is calculated from the difference in Processing step S3 obtained from each of the feature amounts 40 (Processing step S5).

After the above iterative processing is executed for all the learning models and for the feature amount 40, the process of Processing step S7 is started. In Processing step S7, the minimum statistic of the difference obtained in Processing step S5 is obtained from the plurality of feature extraction learning models m2. Then, in Processing step S8, the symbol 20 (see FIG. 8) of the feature extraction learning model m2 when the difference in Processing step S3 takes the minimum value in Processing step S7 is selected. From the symbol 20 selected in Processing step S8, the feature extraction learning model m2 and the recall learning model m4 can be uniquely identified by referring to the database DB.

Hereinafter, the details of Processing step S3 of FIG. 9 will be described with reference to the examples of FIGS. 10*a*, 10*b*, 11 and 12.

Figure 10A:
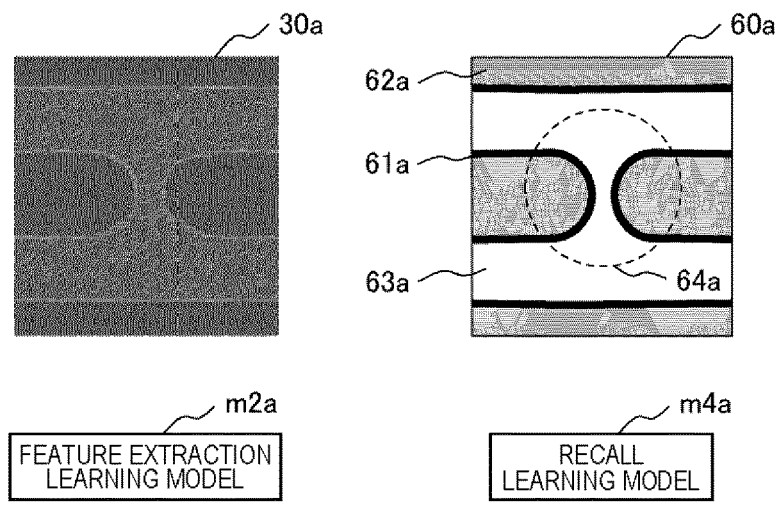
FIG. 10a is a diagram illustrating a concrete configuration example of a feature extraction learning model m2a (left) stored in the database DB of FIG. 8 and a corresponding recall learning model moa (right).

First, FIG. 10*a* illustrates a concrete configuration example of the feature extraction learning model m2*a* (left) stored in the database DB of FIG. 8 and the corresponding recall learning model moa (right). Further, FIG. 10*b* illustrates a concrete configuration example of the feature extraction learning model m2*b* (left) stored in the database DB of FIG. 8 and the recall learning model mob (right).

In performing the process of Processing step S3, it is assumed that various data stored in the database DB of FIG. 8 are prepared in advance as follows.

First, as illustrated in FIG. 10*a*, the feature extraction learning model m2*a* stored in the database DB of FIG. 8 learns the input data 30*a* and the training data 60*a*, and the input data 30 similar to the input data 30*a* and its training data as a learning sample. In addition, as illustrated in FIG. 10*b*, the feature extraction learning model m2*b* learns the input data 30*b* and the training data 60*b*, and the input data 30 similar to the input data 30*b* and the training data as a learning sample.

Figure 10B:
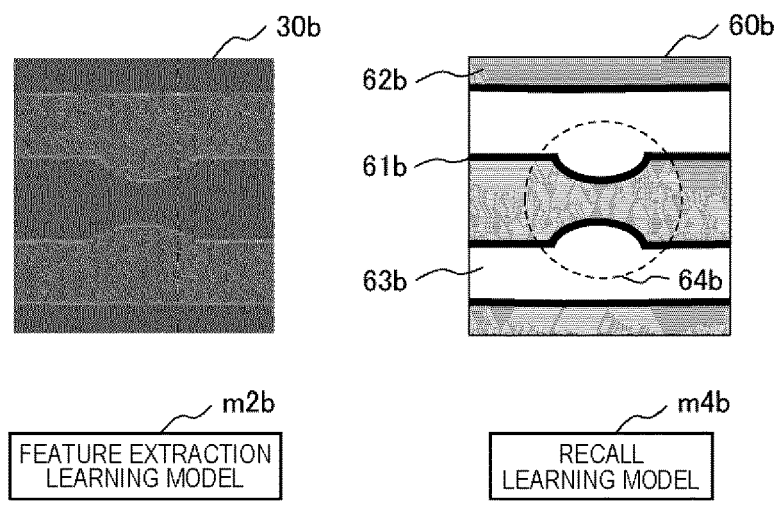
FIG. 10b is a diagram illustrating a concrete configuration example of a feature extraction learning model m2b (left) stored in the database DB of FIG. 8 and a corresponding recall learning model m4b (right).

Further, as illustrated in FIGS. 10*a* and 10*b*, the training data 60*a* and 60*b* are assigned with the category of contour lines 61*a* and 61*b*, closed regions 62*a* and 62*b*, and the backgrounds 63*a* and 63*b* when the feature amount 40 is ideally extracted from each pixel of the input data 30*a* and 30*b*.

Here, in the training data 60*a* of FIG. 10*a*, the left and right closed regions 62*a* are separated in a central portion 64*a*, while in the training data 60*b* of FIG. 10*b*, the left and right closed regions 62*a* are connected in a central portion 64*b*. In addition, the recall learning model moa is pre-learned from an image similar to the training data 60*a* and the input data 30*a* and the training data. The recall learning model mob is learned from images similar to the training data 60*ab* and the input data 30*b* and their training data.

Figure 11:
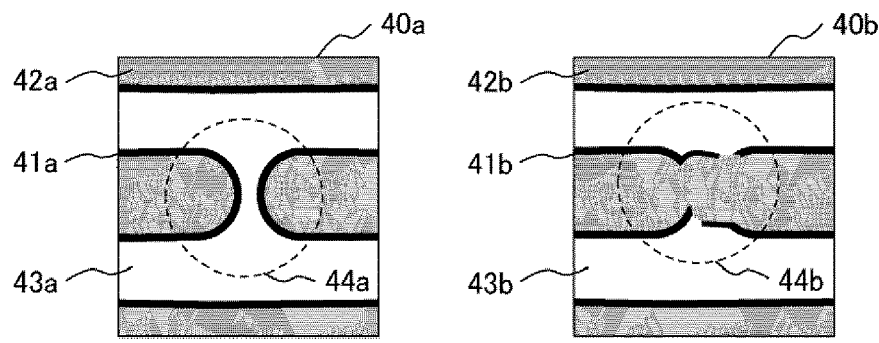
FIG. 11 is a diagram illustrating an example of feature amounts 40a and 40b output by the feature amount extraction unit 1 using the feature extraction learning models m2a and m2b.

Hereinafter, a case where one image almost the same as the input data 30*a* is given as the input sample 10 will be described as an example. FIG. 11 is a diagram illustrating an example of the feature amounts 40*a* and 40*b* output by the feature amount extraction unit 1 using the feature extraction learning models m2*a* and m2*b*.

At this time, as illustrated on the left of FIG. 11, in the feature amount 40a output by the feature amount extraction unit 1 using the feature extraction learning model m2a, the input data 30a of FIG. 10a similar to the input sample 10 is in the learning sample. Thus, the category of a contour line 41a, a closed region 42a, and a background 43a is accurately identified everywhere, including the central 44a.

On the other hand, as illustrated on the right of FIG. 11, in the feature amount 40b output using the feature extraction learning model m2b, the input data 30b of the learning sample (see FIG. 10b) and the input data 30 similar thereto are not similar to the input sample 10. Thus, the category of a contour line 41b, a closed region 42b, and a background 43b, which is erroneously discriminated, is included in the feature amount 40b. Further, this erroneous discrimination is concentrated in the central portion 44b where the difference in the appearance of the image is large between the input data 30a and the input data 30b.

Figure 12:
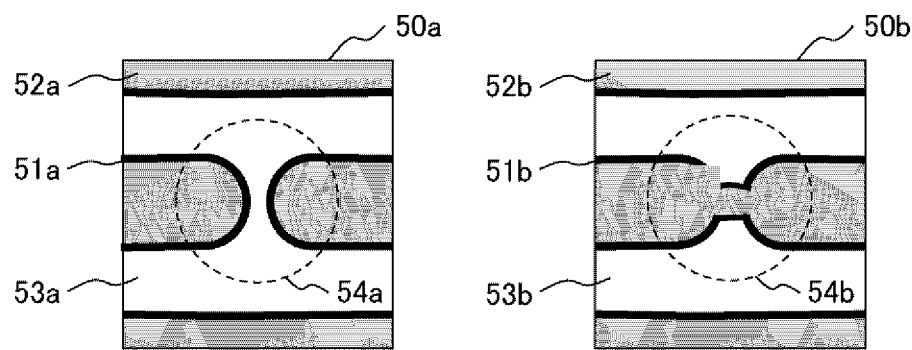
FIG. 12 is a diagram illustrating recall results 50a and 50b output from the feature amounts 40a and 40b with reference to recall learning models moa and m4b by the data-to-data recall unit 3.

FIG. 12 illustrates the recall results 50a and 50b output from the feature amounts 40a and 40b by the data-to-data recall unit 3 with reference to the recall learning models m4a and m4b.

In the recall result 50a on the left of FIG. 12, the training data 60a similar to the feature amount 40a is included in the learning sample when the recall learning model m4a is learned. Therefore, almost no difference between the feature amount 40a and the recall result 50a is generated in the entire image including the central portion 54a. On the other hand, in the recall result 50b on the right of FIG. 12, the feature amount 40 including the erroneous discrimination in the central portion 44b is not included in the learning sample when a recall learning model m4b is learned as in the feature amount 40b. Therefore, a large difference from the feature amount 40b appears in the central portion 54b.

Based on the examples of FIGS. 10a, 10b, 11 and 12, the difference derivation in the process in Processing step S3 of FIG. 9 is calculated by a vector-to-vector distance when the feature amount 40 and the recall result 50 are high-dimensional vectors.

For example, the contour lines 41 and 51 of each pixel, the closed regions 42 and 52, and the backgrounds 43 and 53 as the first, second, and third elements in the feature amount 40 and the recall result 50 are set as the feature amount vectors sequentially. The distance between the vectors can be calculated by the Euclidean distance between the feature amount vectors (3N dimensions if the number of pixels is N) obtained by combining the vectors as many as the number of pixels of the feature amount 40 and the recall result 50. However, in addition to the Euclidean distance, the distance between two feature amount vectors can be calculated by any scale as long as the scale capable of calculating the distance between the two feature amount vectors is used.

In dimensional compression, even if the data formats of the contour line 51, closed region 52, and background 53 are different from the data formats of the contour line 41, closed region 42, and background 43, there is no problem if a scale capable of calculating the distance between the vectors is used. For example, even if the former data format is a continuous value and the latter data format is a discrete value, the Euclidean distance can be calculated, so there is no problem.

Returning to FIG. 9, the specific processing contents of Processing step S5 will be described. In Processing step S5, the statistic of the difference in Processing step S3 obtained for each of the input data 30 in the input sample 10 is calculated.

The difference statistic can be calculated by the arithmetic mean of the distances of multiple feature amount vectors. However, not only the arithmetic mean but also the harmonic mean, the median, and any other statistic can be applied as long as a representative value can be obtained from a plurality of feature amount vectors. As for the difference statistic, for example, when the input data 30 in the input sample 10 is mainly composed of those similar to the input data 30a, the difference statistic obtained by referring to the recall learning model moa becomes smaller, while the difference statistic obtained by referring to the recall learning model mob becomes large.

In Processing step S7 of FIG. 9, the minimum value of the difference statistic of Processing step S5 is calculated. In Processing step S8, the symbol 20 assigned to the feature extraction learning model m2 when the difference statistic in Processing step S5 takes the minimum value is output. For example, when the input data 30 in the input sample 10 is similar to the input data 30a, Symbol a assigned to the recall learning model moa is output in the database of FIG. 8. In addition to the symbol 20, the learning model selection unit 5 may output information that uniquely determines the feature extraction learning model m2, such as the actual state and file name of the file of the feature extraction learning model m2 specified by the symbol 20.

Figure 13:
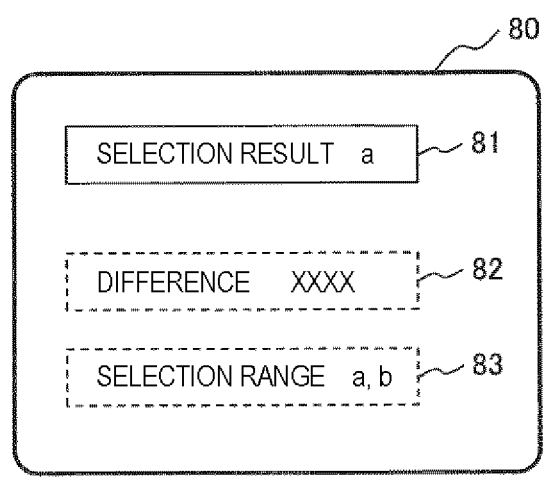
FIG. 13 is a diagram illustrating an example of screen display of the learning model selection unit.

FIG. 13 is a diagram illustrating an example of a screen display of the learning model selection unit 5. The learning model selection unit 5 may use the screen display as illustrated in a screen 80 of FIG. 13 so that the operator who controls the execution of the first embodiment can visually confirm the selection result. A selection result 81 illustrates the symbols 20 selected by the learning model selection unit 5 (the row a in the drawing) among the symbols 20 in the database of FIG. 8. In the screen 80, the numerical value of the difference of the selected learning model (statistic of the difference in Processing step S5) as indicated by 82 and the selection range of the symbol 20 which is a learning model selection target as indicated by 83 may be displayed so that the operator can grasp the details of the learning model selection.

In the first embodiment of the invention, the difference between the feature amount 40 output by the feature amount extraction unit 1 and the recall result 50 output by the data-to-data recall unit 3 is obtained by the method described above, and the symbol 20 is selected under a condition that the difference is minimized, so that it becomes possible to select the optimum feature extraction learning model m2 for the input sample 10 from the feature amount extraction learning model group. At this time, in order to obtain the difference, the correct answer value is not required unlike PTL 1, and the certainty is not required unlike PTL 2.

Second Embodiment

In the first embodiment, the image recognition device is configured on the premise that the learning model is properly configured, but in the second embodiment, the image recognition device is also proposed in consideration of that the learning model is not properly configured.

Figure 14:
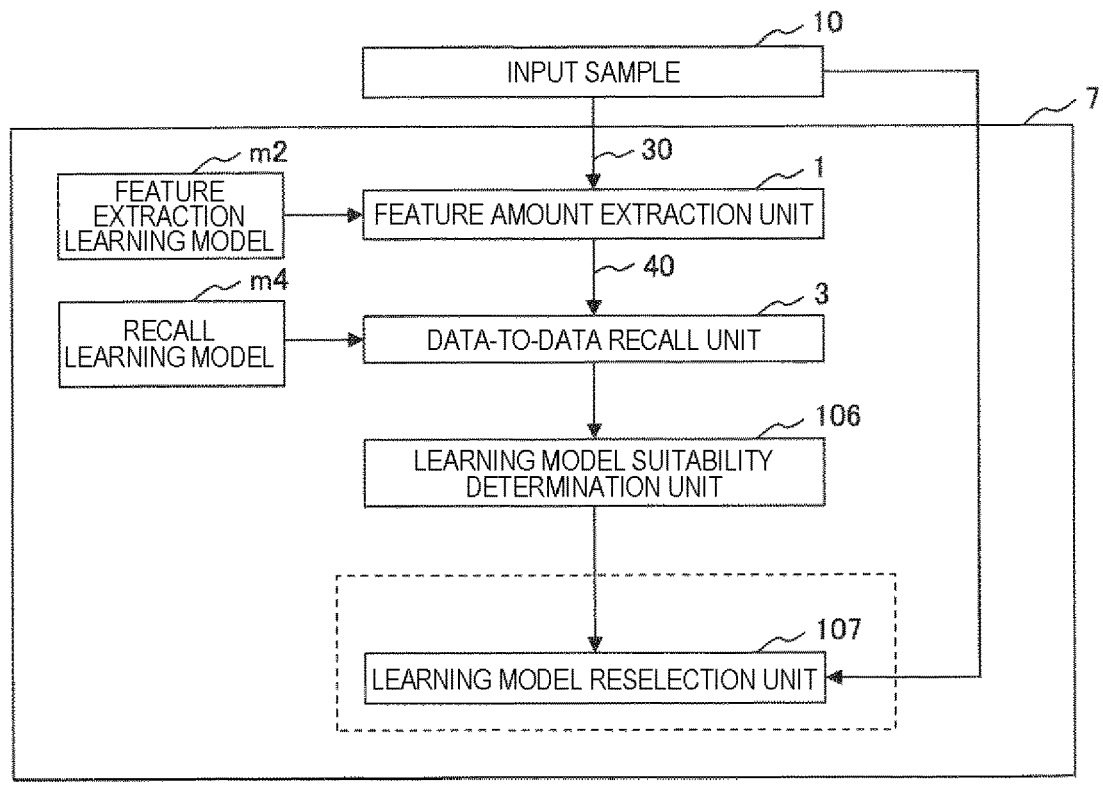
FIG. 14 is a diagram illustrating an example of a functional configuration of an image recognition device according to a second embodiment of the invention.

FIG. 14 illustrates an example of the functional configuration of an image recognition device 7 according to the second embodiment of the invention. The difference between the image recognition device 7 of FIG. 14 and the configuration of FIG. 1 is that a learning model suitability determination unit 106 is added, and the learning model selection unit 5 of FIG. 1 is configured like a learning model reselection unit 107.

In FIG. 14, first, m2 and m4 are a feature extraction learning model and a recall learning model selected by the first embodiment. Here, the symbol assigned to this learning model is x.

The input sample 10 is a small number of samples of the input data 30 extracted at a predetermined timing during the long-term operation of contour extraction. The term "long-term operation" refers to a timing at which contour extraction is continuously operated for a predetermined period or longer after the learning model is selected by the method of the first embodiment.

The feature amount extraction unit 1 extracts the feature amount 40 from the input data 30 in the input sample 10 with reference to the feature extraction learning model m2. The data-to-data recall unit 103 refers to the recall learning model m4, and outputs the recall result 50 from the feature amount 40 output by the feature amount extraction unit 1.

The learning model suitability determination unit 106 added in the second embodiment calculates a difference statistic in the same procedure as Processing step S5 of FIG. 9 from the feature amount 40 and the recall result 50 output by the feature amount extraction unit 1 and the data-to-data recall unit 3. Then, when the difference statistic becomes larger than a predetermined threshold set in advance, it is determined that the learning model of Symbol x is incompatible with the input data 30 at the time of long-term operation in which the input sample 10 is sampled. The result of this determination is output on the display of the screen 80 or the like output by the learning model reselection unit 107 (corresponding to the learning model selection unit 5 in FIG. 1). Alternatively, it may be output to a file or notified to an external computer via the network.

The learning model reselection unit 107 may be further provided after the learning model suitability determination unit 106. When the learning model suitability determination unit 106 determines that the learning model is incompatible, the learning model reselection unit 107 takes the input sample 10 as an input (replaces the old input sample 10 with the new input sample 10), and selects the learning model 12 for feature amount extraction in the procedure of the first embodiment.

In the first embodiment of the invention, it is possible to detect that the properties of the input data 30 have changed in the process of long-term operation by the method described above, and the learning model 12 for contour extraction selected by the method of the first embodiment has become incompatible. Further, it is possible to reselect the learning model 12 for contour extraction that is optimal for the input sample 110.

In the configuration of the second embodiment illustrated in FIG. 14, the learning model suitability determination unit 106 can be installed between the data-to-data recall unit 3 and the learning model selection unit 5 in the configuration of the first embodiment illustrated in FIG. 1. The learning model suitability determination unit 106 is not used at the beginning of the operation in the image recognition device 7, but the learning model suitability determination unit 106 functions based on the subsequent operation experience. The learning model selection unit 5 can perform reselection.

Third Embodiment

In the third embodiment, as a premise of actually operating the image recognition device 7 described in the first and second embodiments, it will be described that the training data required in the design and preparation stages of the image recognition device 7 is easily obtained, and the learning model is obtained. Therefore, the learning model as the learning result of the third embodiment is reflected in the first and second embodiments.

Figure 15:
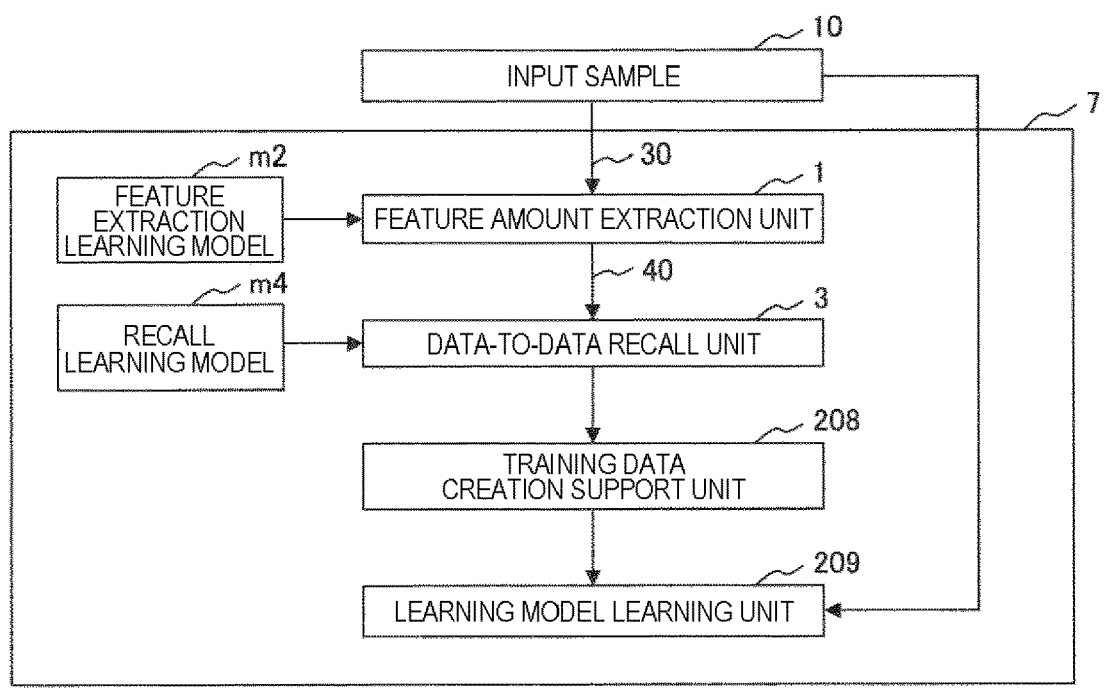
FIG. 15 is a diagram illustrating an example of a functional configuration of an image recognition device according to a third embodiment of the invention.

FIG. 15 illustrates an example of the functional configuration of the image recognition device according to the third embodiment of the invention. The difference between the image recognition device 7 in FIG. 15 and the configuration in FIG. 1 is that the training data creation support unit 208 and a learning model learning unit 209 are added.

Here, in FIG. 15, the learning model selection unit 5 in FIG. 1 or the learning model suitability determination unit 106 in FIG. 14 is not described, but these functions are merely not described, but are configured in actual operation as in the first and second embodiments. m2 and m4 are the feature extraction learning model and the recall learning model selected in the first embodiment. The input sample 10 is a set of arbitrary input data 30, and may be, for example, the input sample 10 described in the first and second embodiments. The feature amount extraction unit 1 extracts the feature amount 40 from the input data 30 in the input sample 10 with reference to the feature extraction learning model m2. The data-to-data recall unit 3 refers to the recall learning model m4, and outputs the recall result 50 from the feature amount 40 output by the feature amount extraction unit 201.

The training data creation support unit 208 added in the third embodiment obtains the difference between the feature amount 40 and the recall result 50 output by the feature amount extraction unit 1 and the data-to-data recall unit 3 in the procedure of Processing step S3 in FIG. 9, and is configured to include a supervised user interface for training the narrowing-down of input places when the differences are many.

Figure 16:
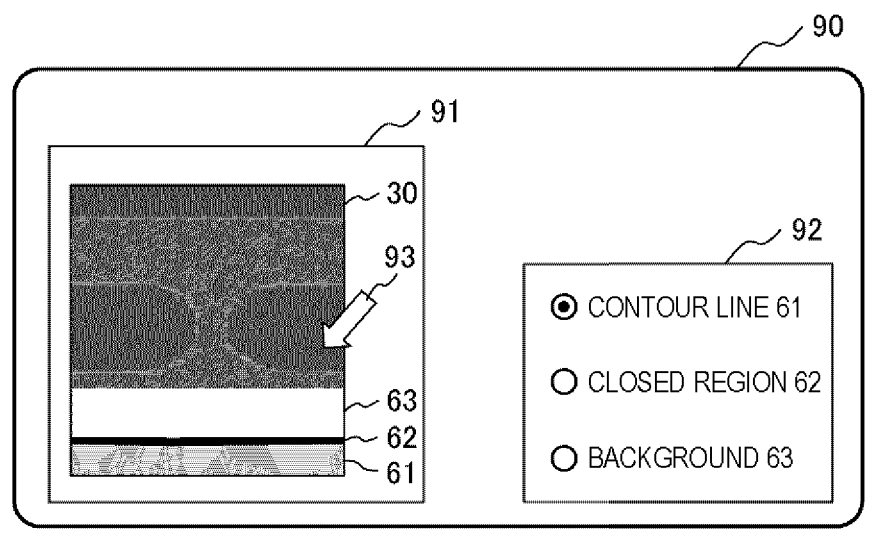
FIG. 16 is a diagram illustrating an example of a display screen in a training data creation support unit 208.

A screen 90 in FIG. 16 is an example of the user interface of the training data creation support unit 208, and is composed of an input screen 91, an input selection 92, and an input pen 93. On the input screen 91, the operator can assign a category of a contour line 61, a closed region 62, and a background 63 by roughly sketching the input data 30. The label of the input screen 91 is assigned by the operator selecting the category of the contour line 61, the closed region 62, and the background 63 from the radio buttons of the input selection 92 and operating the input pen 93. As described above, in the user interface of the learning sample creation support unit 208, it is preferable to have a function of drawing the category of the feature amount by roughly sketching the input data and further inputting the category of the feature amount.

On the input screen 91, the training data creation support unit 208 determines a place where the difference in Processing step S3 is small and a place where the difference is large. In the small place and large place, it is assumed that the difference is large if the density of the difference in Processing step S3 when the input data 30 in the input screen 91 is divided into blocks or the like is higher than a threshold, and the difference is small if the difference density is lower than the threshold. Then, the label of the place where the difference in Processing step S3 is small is displayed so as to be the same as the feature amount 40. That is, the contour line 41, the closed region 42, and the background 43 in the feature amount 40 are assigned to the contour line 61, the closed region 62, and the background 63 in the input screen 91 in this order. Then, the operator is urged to input to the input screen 91 by narrowing down to the area where the difference in Processing step S3 is large.

For example, when the rough sketch of the input screen 91 is the input data 30*a*, the feature extraction learning model m2 and the recall learning model m4 are m2*b* and m0*b*, respectively, the place where there is a difference in Processing step S3 becomes the central portion 44*b* (the difference between the feature amount 40*b* extracted from the input data 30*a* and the recall result 50*b* extracted from the feature amount 40*b*).

Here, the training data creation support unit 208 generates a category (the contour line 61, the closed region 62, and the background 63) in the screen 91 from the plurality of feature amounts 40 and recall results 50 (by forming the feature extraction learning model m2 and the recall learning model m4 from a plurality of pairs of feature extraction learning models m2 and recall learning models m4), so that the accuracy of the category in the screen 91 can be improved. For example, a place where the difference in Processing step S3 exists may be obtained from statistics such as the mode of the difference between the plurality of feature amounts 40 and recall results 50, and the category in the screen 91 may be generated. Alternatively, by operating a button (not illustrated) on the screen 90, the operator may switch the plurality of feature amounts 40 and recall results 50 to select one appropriate for generating a category in the screen 91. In this way, the learning sample creation support unit 208 may perform at least one of obtaining an input place using the plurality of feature amounts and recall results, or switching the input place.

Further, the learning model learning unit 209 added in the third embodiment uses a learning sample in which the input data 30 in the input sample 10 and the input result of the screen 90 are combined with the training data to learn the feature extraction learning model m2. In the learning of the learning model learning unit 209, an arbitrary learning sample may be added in addition to the learning sample so that the inference result of the feature amount 40 when the learning model is referred to comes to be excellent.

In the learning in the learning model learning unit 209, in preparation for the reselection of the learning model during long-term operation described in the second embodiment, the recall learning model m4 is learned in addition to the feature extraction learning model m2, and a new symbol 20 may be assigned and added to the database DB of FIG. 8.

In this way, the learning model learning unit further learns the recall learning model, adds the feature amount learning model learned by the learning model learning unit to the feature extraction learning model group, and adds the recall learning model learned by the learning model learning unit to the feature extraction learning model group.

In the third embodiment of the invention, according to the method described above, the feature extraction learning model m2 optimal for the population where the input sample 10 is sampled can be learned using the training data obtained by narrowing down the places input by the operator using the training data creation support unit 208. By narrowing down the places input by the operator, the man-hours for creating the training data can be reduced as compared with assigning the training data to all the pixels of the input data 30 in the input sample 10.

Fourth Embodiment

In the fourth embodiment, it will be described that the optimum learning model is easily obtained.

Figure 17:
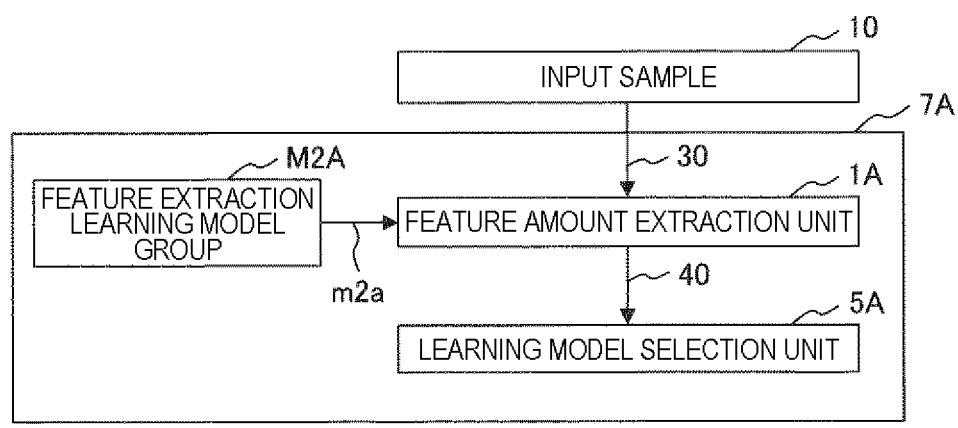
FIG. 17 is a diagram illustrating an example of a functional configuration of an image recognition device according to a fourth embodiment of the invention.

FIG. 17 illustrates an example of the functional configuration of the image recognition device 7A according to the fourth embodiment of the invention. The configuration of FIG. 17 excludes the configuration of the data-to-data recall unit 3 from the configuration of FIG. 1, but a part of handling data, inter configurations, or processing contents of the feature extraction learning model group M2, the feature amount extraction unit 1, and the learning model selection unit 5 are different, which are denoted as the feature extraction learning model group M2A, the feature amount extraction unit 1A, and the learning model selection unit 5A in FIG. 17, respectively.

First, the feature extraction learning model group M2A is a set of feature extraction learning model m2A that especially can output a score for each category when extracting the feature amount 40, among other feature extraction learning models m2.

The feature amount extraction unit 1A refers to each of the feature extraction learning models m2A in the feature extraction learning model group M2A, and outputs the feature amount 40 and the score from each of the input data 30 in the input sample 10.

The learning model selection unit 5A calculates a common scale capable of comparing the reliability of the category discrimination results among the plurality of types of feature extraction learning models m2A from the score, and selects an optimal feature extraction learning model m2A under a condition that the common scale is minimized.

Figure 18:
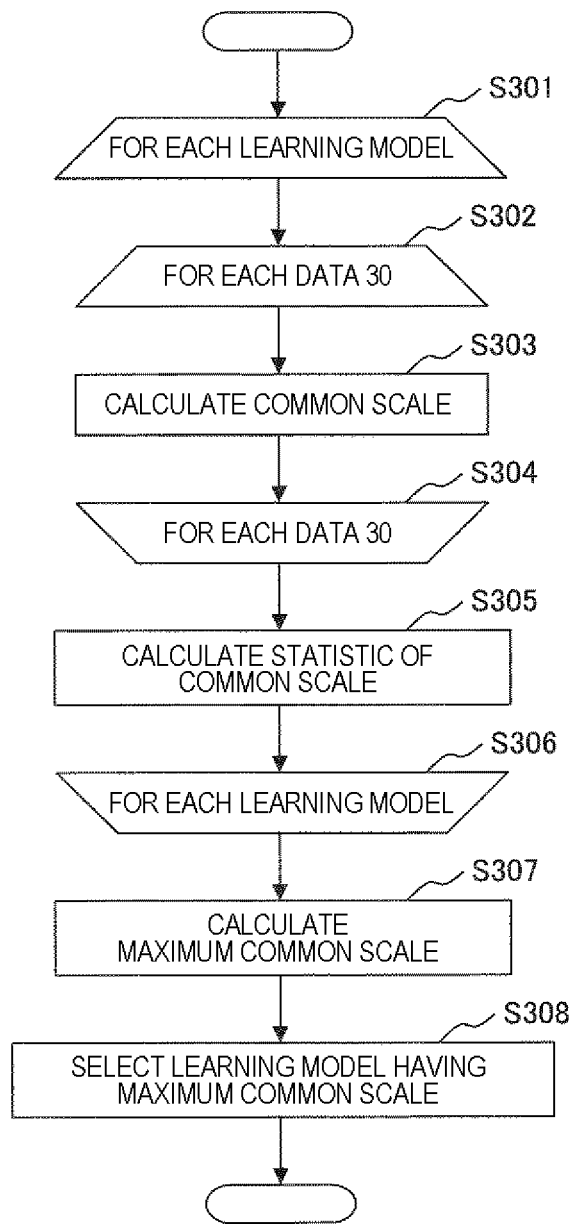
FIG. 18 is a diagram illustrating a signal processing flow of a learning model selection unit 5A of FIG. 17.

FIG. 18 is a diagram illustrating a signal processing flow of the learning model selection unit 5A of FIG. 17. In this flow, the combination of Processing step S301 and Processing step S306 means that the processing between them is repeatedly executed for each learning model. Further, in this flow, the combination of Processing step S302 and Processing step S304 means that the processing between them is repeatedly executed for each input data 30.

According to the flow of FIG. 18, first, in each of the feature extraction learning models m2A in the feature extraction learning model group M2A (Processing step S301 to Processing step S306), a common scale is calculated from the score in Processing step S303 for each of the input data 30 in the input sample 10 (Processing step S302 to Processing step S304).

Then, from the common scale of Processing step S303 obtained from each of the input data 30, the statistic of the common scale is calculated from the mean value, the median value, and the like of the common scale in each pixel in each input data 30 in Processing step S305.

After the above iterative processing is executed for all the learning models and the input data 30, the process of Processing step S307 is started. In Processing step S307, the maximum value of the statistic of the common scale obtained in Processing step S305 is obtained. Then, in Processing step S308, the symbol 20 of the feature extraction learning model m2A when the common scale takes the maximum value is selected.

Figure 19:
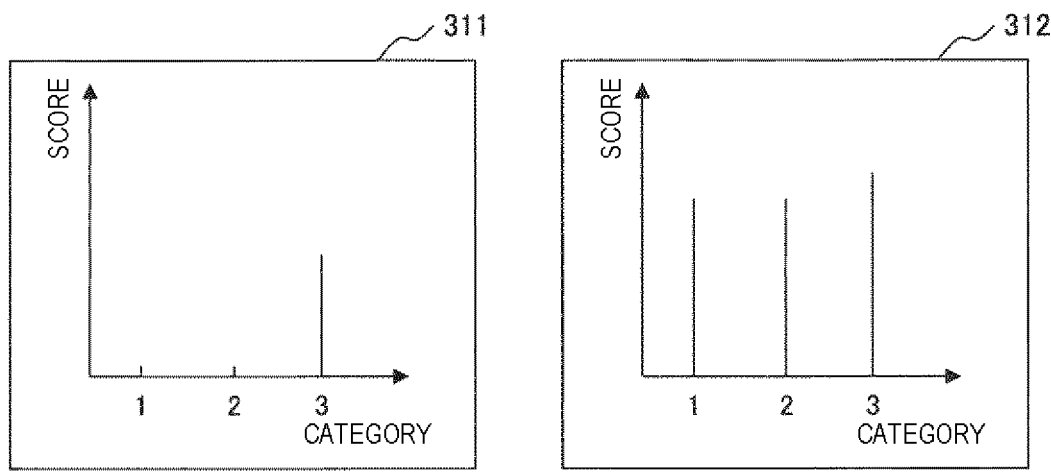
FIG. 19 is a diagram for explaining an example of how to obtain a common scale in Processing step S303.

FIG. 19 illustrates an example of the common scale of Processing step S303 of FIG. 18. Graphs 311 and 312 illustrate the scores for each category obtained from the learning model m2A for different types of feature amount extraction. The above-mentioned type indicates that the mathematical model of machine learning and a network structure of deep learning in the learning model m2A for feature amount extraction are different. The categories in the graphs 311 and 312 refer to the labels assigned to the contour line 41, the closed region 42, and the background 43 that form the feature amount 40. Looking at the two scores in the graph 311 and graph 312, the values in the graph 312 are larger than those in the graph 311 but the scales are different due to the different types, so the magnitude cannot be compared.

Here, in general, the learning model m2A for feature amount extraction discriminates into the category having the largest score. At this time, the more the difference between the maximum value of the score and the other values is, the more reliable the discrimination of the category is. For example, the score in the graph 312 is highest in the category 3, but the difference between the scores in the categories 1 and 2 is small. Therefore, it is considered that it is unreliable to discriminate the category 3 from the graph 312 because the classification result will change if the score fluctuates due to a slight disturbance. On the contrary, the score in the graph 312 has a large difference between the category 3 having the largest value and the other categories 1 and 2. Therefore, it is considered that the classification of the category 3 from the graph 311 is highly reliable because the discrimination result does not change even if there is some disturbance.

Therefore, in Processing step S303, the variation in the score is used as a common scale. The variation is a statistic illustrating the degree of variation such as the standard deviation and entropy of the score, and the larger the value, the more the difference in the score between categories is shown as illustrated in the graph 311. Alternatively, in Processing step S303, the degree of protrusion of the score may be used as a common scale. The degree of protrusion is an index indicating how much the maximum value of the score is outstandingly large compared to other scores. For example, the degree of protrusion can be calculated by the difference between the maximum value of the score and the average value of the scores in the graph 311 or the difference between the maximum value of the score and the second largest value of the score.

Another example of the common scale in Processing step S303 will be described with reference to FIG. 20. The certainty 1 in the graph 321 is the maximum value of the score in the graph 311. It is common in an algorithm for categorization using machine learning to use the maximum value of the score as the degree of certainty. The certainty 2 in the graph 322 is the maximum value of the score in the graph 321. The correct answer rate in the graphs 321 and 322 is an index which is an expected value of the correct answer rate indicating the probability of the correct answer when the discrimination result of the category when the certainty 1 and the certainty 2 take a predetermined value is used as the population. A learning sample when the feature extraction learning model 12 is learned can be applied to the population, but the invention is not limited to this, and a set of arbitrary input data 30 and its training data can be applied.

In Processing step S303 of FIG. 18, the correct answer rate can be used as a common scale. For example, when the degree of certainty calculated from the graphs 311 and 312 are k1 and k2, the correct answer rates in the graphs 321 and 322 are y1 and y2, and y1 is higher than y2, so the correct answer rate is higher for the discrimination result of the category obtained from the graph 311, thus it is considered that the reliability is high. Therefore, in Processing step S303, a common index can be obtained by converting the degree of certainty such as the certainty 1 and the certainty 2 into the correct answer rate.

Figure 20:
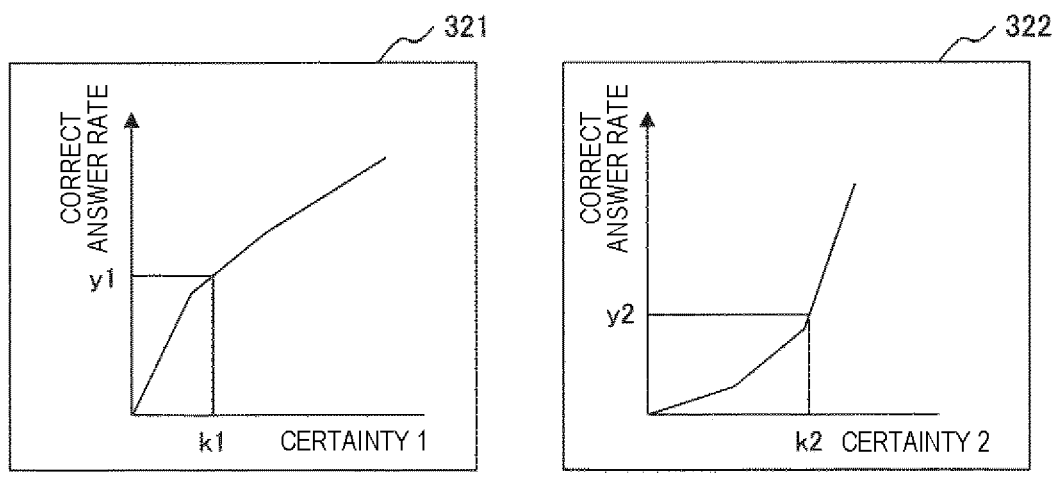
FIG. 20 is a diagram for explaining another example of how to obtain a common scale in Processing step S303.

In Processing step S303 of FIG. 18, when the variations and the magnitudes of the protrusions are significantly different in the feature extraction learning models m2A of a plurality of types, the common scale may be obtained after the conversion to the correct answer rate in the same procedure as in the description of FIG. 20. Alternatively, in order to suppress the size variation among the feature extraction learning models m2A of a plurality of types, the statistics such as the variation and the average value of the protrusions in the population are obtained and divided by this statistic for normalization.

In the fourth embodiment of the invention, if the method described above is limited to the type capable of outputting the score when extracting the feature amount 40 in the feature extraction learning model m2A, it becomes possible to select the most suitable one for the input sample 10 from the plurality of feature extraction learning models m2A. Further, unlike PTL 2, it is possible to select the feature extraction learning model m2A even if the degree of certainty of the feature extraction learning model m2A in the feature extraction learning model group M2A is different.

Figure 21:
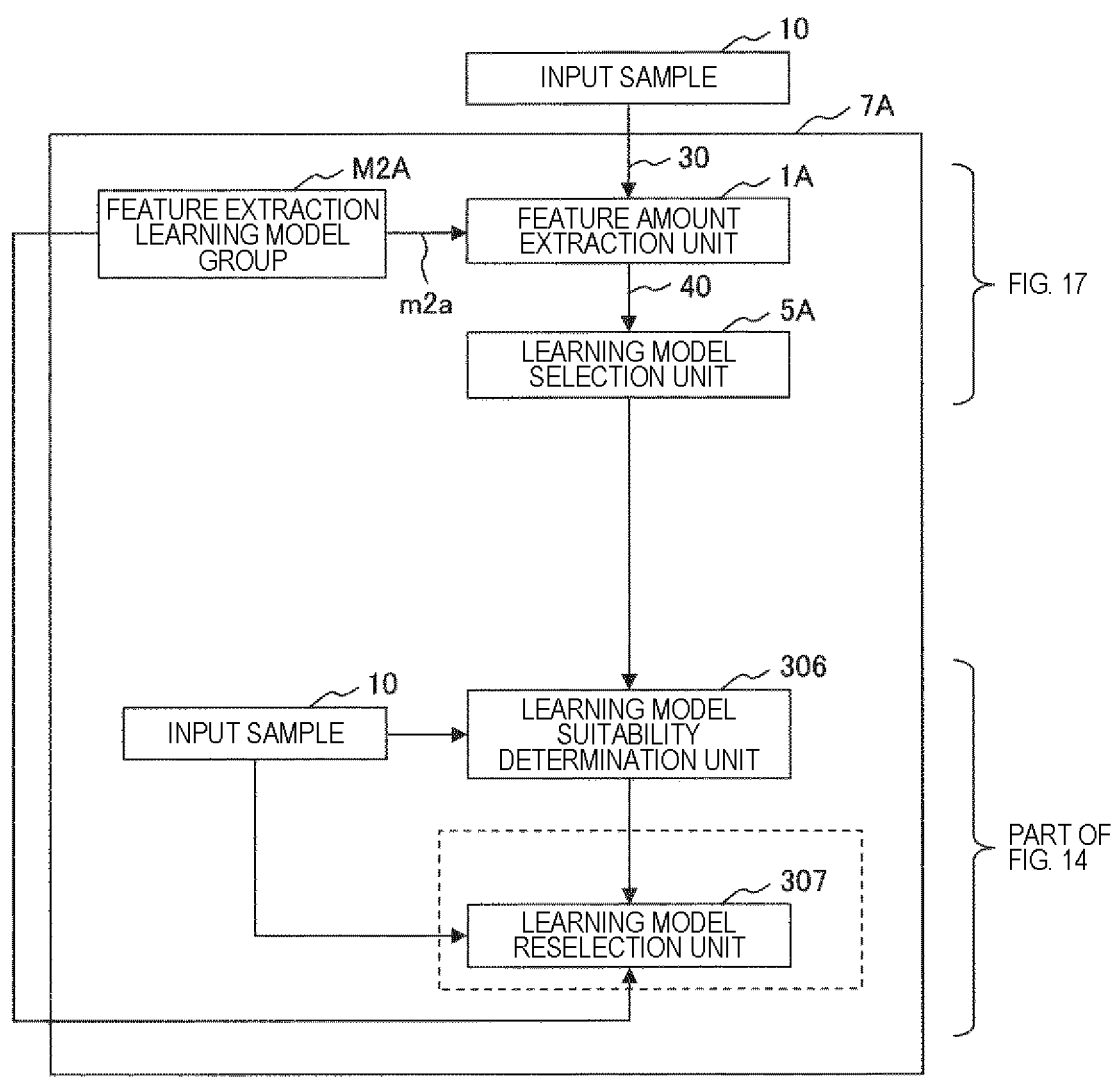
FIG. 21 is a diagram illustrating a functional configuration example of an image recognition device 7A according to a first modification of the fourth embodiment.

FIG. 21 illustrates a functional configuration example of the image recognition device 7A according to a first modification of the fourth embodiment. The upper part of the image recognition device 7A of FIG. 21 adopts the configuration of FIG. 17, and the lower half is a combination of the partial configuration of FIG. 14.

In the first modification of the fourth embodiment of the invention, as illustrated in FIG. 21, during a long-term operation as in the second embodiment, there may be provided a learning model suitability determination unit 306 which determines the suitability of the feature extraction learning model m2 selected by the learning model selection unit 5A for the input sample 10 using the statistic of the common scale obtained in the same procedure as Processing step S305 from the input data 30 constituting the input sample 110. If the statistic of the common scale obtained by the same procedure as in Processing step S305 is smaller than a predetermined threshold, the learning model suitability determination unit 306 determines that the reliability is low and it is not suitable. Further, there may be provided a learning model reselection unit 307 which selects an appropriate feature extraction learning model m2 from the feature extraction learning model group M2 for the input sample 10 when the learning model suitability determination unit 306 determines that the feature extraction learning model is not suitable (the functions of the feature amount extraction unit 301 and the learning model selection unit 306 are included).

Figure 22:
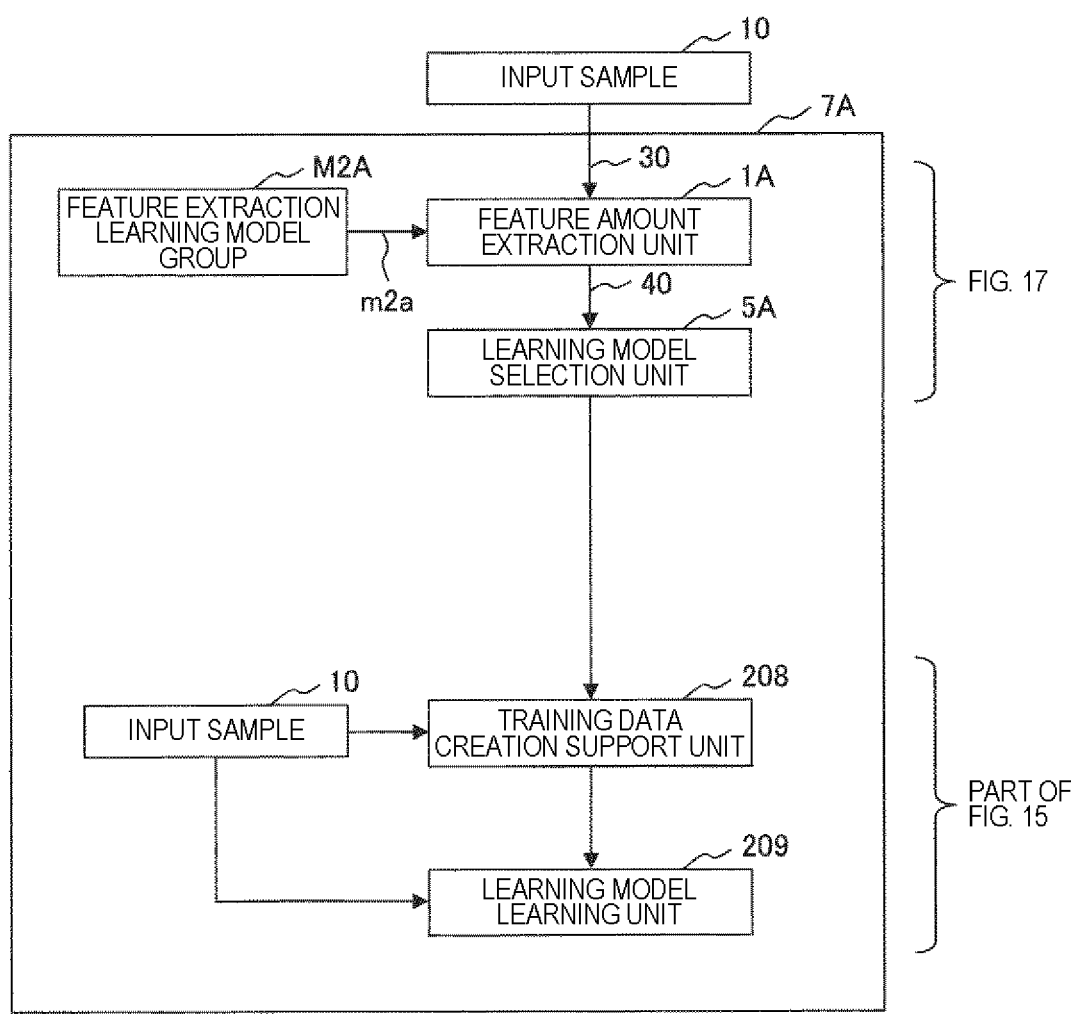
FIG. 22 is a diagram illustrating a functional configuration example of the image recognition device 7A according to a second modification of the fourth embodiment.

FIG. 22 illustrates a functional configuration example of the image recognition device 7A according to a second modification of the fourth embodiment. The upper part of the image recognition device 7A in FIG. 22 adopts the configuration of FIG. 17, and the lower half is a combination of the partial configuration of FIG. 15.

In order to obtain the common scale of Processing step S305 of FIG. 18 from the input sample 10, the image recognition device 7A according to the second modification of the fourth embodiment of the invention may include a training data creation support unit 308 which is equipped with a user interface for narrowing down the input place of the training data in the training data creation support unit 208 to a small place (a place where the reliability of the category discrimination of the feature amount 40 is low) of the common scale of Processing step S305, and a learning model learning unit 309 which learns the learning model m2 for feature amount extraction using the training data created by the training data creation support unit 308.

As a result, as in the third embodiment, the feature extraction learning model m2, which is optimal for the population in which the input sample 210 is sampled, can be learned by using the training data narrowed down to the place input by the operator. Further, the learning model learning unit 309 may add the learned feature amount extraction learning model m2 to the feature extraction learning model group M2 so as to be selected by the learning model reselection unit 307.

In the first to fourth embodiments of the invention described above, the components can be changed as follows without departing from the essence of the invention.

The categories constituting the feature amount 40 are not limited to those other than the contour line 41, the closed region 42, and the background 43. For example, a category such as a corner point of a contour line may be added. Further, the category may be omitted from the contour line 41, the closed region 42, and the background 43. Correspondingly, the components of the training data category such as recall results 50 and 60a also change.

In addition to the contour lines described above, the feature amount 40 can be any feature amount that can be extracted from the input data 30 (that is, an image). For example, a design drawing of the input data 30 or a defect in the input data 30 may be used as the feature amount 40. Correspondingly, the categories that compose training data such as recall results 50 and 60a also change. The arbitrary feature amount is not limited to the category of each pixel as long as the recall result 50 can be obtained. For example, the arbitrary feature amount can be the brightness of each pixel.

In addition to the method of extracting the feature amount 40 by using the machine learning described above, the feature amount extraction unit 1 may perform image processing in which appropriate parameters differ depending on the input sample 10. In this case, the feature extraction learning model m2 is the parameter. In the image processing, for example, the brightness gradient and the brightness are obtained for each pixel in the input data 30, and each pixel in the input data 30 may be discriminated to the category of the contour line 41 and the background 43 by comparing to a predetermined threshold in the parameter. Alternatively, the feature amount extraction unit 1 may mix machine learning and the image processing. In this case, the feature amount extraction unit 1 may switch between the machine learning and the image processing according to the feature extraction learning model m2 in the feature extraction learning model group M2.

In addition to the images described above, the input data 30 can be any data from which the data-to-data recall unit 3 can output a recall result accompanied by dimensional compression in the first to third embodiments. Correspondingly, the categories that compose training data such as recall results 50 and 60a also change. For example, the input data 30 may be an utterance voice and the feature amount 40 may be an alphabet.

INDUSTRIAL APPLICABILITY

The learning model selection of the invention can be applied not only to the selection of the learning model for contour line extraction, but also to the whole system using arbitrary machine learning that handles the feature amount that can be recalled with dimensional compression from the feature amount.

REFERENCE SIGNS LIST 1 feature amount extraction unit
2 feature extraction learning model group
3 data-to-data recall unit
4 recall learning model group
5 learning model selection unit
10 input sample

The invention claimed is:

1. An image recognition device, comprising:
a feature extraction learning model group that stores a plurality of feature extraction learning models;
a recall learning model group that stores a recall learning model which is paired with a feature extraction learning model among the plurality of feature extraction learning models;
a feature amount extraction unit that extracts a feature amount from input data with reference to the feature extraction learning model;
a data-to-data recall unit that outputs a recall result accompanied by dimensional compression of the feature amount with reference to the recall learning model; and
a learning model selection unit that selects the feature extraction learning model from a feature extraction learning model group under a condition that a difference between the feature amount and the recall result is minimized.

2. The image recognition device according to claim 1, comprising:
a learning model suitability determination unit that determines whether the feature extraction learning model is suitable, the feature extraction learning model being selected for a population where a sample of the input data is sampled, from a difference between the feature amount and the recall result.

3. The image recognition device according to claim 2, wherein, when the learning model suitability determination unit determines that the feature extraction learning model is not suitable, the feature extraction learning model is reselected using a sample of the input data.

4. The image recognition device according to claim 1, comprising:
a training data creation support unit that includes a supervised user interface for narrowing down an input place when a difference between the feature amount and the recall result is large in the sample of the input data; and
a learning model learning unit that learns the feature extraction learning model using training data created by the training data creation support unit.

5. The image recognition device according to claim 4, wherein there is provided a function of roughly drawing the input data in the user interface in the training data creation support unit to draw a category of the feature amount, and to input the category of the feature amount.

6. The image recognition device according to claim 4, wherein the training data creation support unit performs at least one of obtaining the input place using the plurality of feature amounts and recall results and switching the input place.

7. The image recognition device according to claim 4, wherein the learning model learning unit further learns the recall learning model, and
wherein the feature amount learning model learned by the learning model learning unit is added to the feature extraction learning model group, and the recall learning model learned by the learning model learning unit is added to the feature extraction learning model group.

8. The image recognition device according to claim 1, wherein the feature amount is a category of an element in the input data.

9. The image recognition device according to claim 1, wherein the input data is an image, and the feature amount is a contour line or a design drawing.

10. The image recognition device according to claim 1, wherein the dimensional compression is performed by using principal component analysis or an autoencoder.

11. The image recognition device according to claim 1, wherein one or more feature amount extraction units using a method other than machine learning are included in the feature amount extraction unit.

12. The image recognition device according to claim 1, wherein the learning model selection unit displays one or more of a selection result of the feature extraction learning model, the difference, and a selection range of the feature extraction learning model in a screen.

13. An image recognition device, comprising:
a feature extraction learning model group that stores a plurality of feature extraction learning models;
a feature amount extraction unit that extracts a feature amount from input data with reference to a feature extraction learning model among the plurality of feature extraction learning models; and
a learning model selection unit that calculates a common scale capable of being compared among a plurality of types of learning models from a score when the feature amount extraction unit extracts the feature amount, and selects the feature extraction learning model using the common scale from a feature extraction learning model group.

14. The image recognition device according to claim 13, comprising:
a learning model suitability determination unit that determines whether the feature extraction learning model selected from the common scale is suitable.

15. The image recognition device according to claim 14, comprising:
a learning model reselection unit that reselects the feature extraction learning model using a sample of the input data when the learning model suitability determination unit determines that it is not suitable.

16. The image recognition device according to claim 13, comprising:
a training data creation support unit that includes a supervised user interface for narrowing down an input place when the common scale is small in a sample of the input data; and
a learning model learning unit that learns the feature extraction learning model using training data created by the training data creation support unit.

17. The image recognition device according to claim 16, wherein the user interface in the training data creation support unit has a function of roughly drawing the input data to draw a category of the feature amount, and to input a category of the feature amount.

18. The image recognition device according to claim 16, wherein the feature amount learning model learned by the learning model learning unit is added to a feature extraction learning model group.

19. The image recognition device according to claim 13, wherein the feature amount is a category of an element in the input data.

20. The image recognition device according to claim 13, wherein the input data is an image, and the feature amount is a contour line or a design drawing.

21. The image recognition device according to claim 13, wherein the common scale is a statistic representing a degree of variation in the score or a statistic representing a degree of protrusion of the score.

22. The image recognition device according to claim 13, wherein the common scale is a correct answer rate converted from the score.

23. The image recognition device according to claim 13, wherein one or more feature amount extraction units using a method other than machine learning are included in the feature amount extraction unit.

24. The image recognition device according to claim 13, wherein the learning model selection unit displays one or more of a selection result of the feature extraction learning model, a difference, and a selection range of the feature extraction learning model in a screen.

25. An image recognition method that has a plurality of feature extraction learning models and a plurality of recall learning models which are paired with a feature extraction learning model among the plurality of feature extraction learning models, comprising:
extracting a feature amount from input data with reference to the feature extraction learning model;
obtaining a recall result accompanied by dimensional compression of the feature amount with reference to a recall learning model among the plurality of recall learning models; and
selecting the feature extraction learning model from a feature extraction learning model group under a condition that a difference between the feature amount and the recall result is minimized.

26. An image recognition method that has a plurality of feature extraction learning models, comprising:
extracting a feature amount from input data with reference to a feature extraction learning model among the plurality of feature extraction learning models;
calculating a common scale which can be compared among a plurality of types of learning models from a score when the feature amount is extracted; and
selecting the feature extraction learning model using the common scale from the plurality of feature extraction learning models.

\* \* \* \* \*